United States Patent
Huang et al.

(10) Patent No.: US 7,152,710 B1
(45) Date of Patent: Dec. 26, 2006

(54) SELF-POWERED, HEAT-ACTIVATED LED VEHICLE EXHAUST TIP ASSEMBLY

(76) Inventors: Zhenqiu Huang, 768 S. Turnbull Canyon Rd., City of Industry, CA (US) 91745; John C. Cheng, 768 S. Turnbull Canyon Rd., City of Industry, CA (US) 91745

( * ) Notice: Subject to any disclaimer, the term of this patent is extended or adjusted under 35 U.S.C. 154(b) by 0 days.

(21) Appl. No.: 11/203,835

(22) Filed: Aug. 16, 2005

(51) Int. Cl.
*F01N 7/08* (2006.01)

(52) U.S. Cl. .................. 181/227; 181/228; 136/203; 136/204; 315/318; 315/169.3; 403/374.3; 403/379.3

(58) Field of Classification Search ........... 181/212, 181/227, 228, 251, 289, 249; 136/203, 204, 136/208, 207; 138/110–113; 403/346, 347, 403/370, 373, 374.3, 379.3; 315/312, 318, 315/362, 169.1, 169.3
See application file for complete search history.

(56) References Cited

U.S. PATENT DOCUMENTS

| | | | | |
|---|---|---|---|---|
| 4,463,214 A | * | 7/1984 | Lowther | 136/208 |
| 6,006,859 A | * | 12/1999 | Hussaini | 181/227 |
| 6,238,122 B1 | * | 5/2001 | Brooks et al. | 403/24 |
| 6,459,218 B1 | * | 10/2002 | Boys et al. | 315/324 |
| 6,609,590 B1 | * | 8/2003 | Zelinski | 181/281 |
| 7,007,720 B1 | * | 3/2006 | Chase et al. | 138/110 |

* cited by examiner

*Primary Examiner*—Haissa Philogene
(74) *Attorney, Agent, or Firm*—Albert O. Cota

(57) ABSTRACT

A self-powered, heat-activated LED exhaust tip assembly (10) that is comprised of three major elements: a cylindrical enclosure (12), a heat conducting sub-assembly (80) and an electronics circuit (130). The sub-assembly (80) consists of an external heat conducting plate (82), and an enclosure-internal heat conductive horizontal structure (110) that is attached to the plate (82) through a heat conductive vertical rod (98). When heated vehicle exhaust gases pass through the enclosure (12), the gases heat the structure (110) and the heat is then transferred to the plate (92) via the rod (98). The heat from the plate (82) is transferred to a peltier device (132) that interfaces with the plate (82). The heated peltier device (132) produces a first d-c voltage (11) that is applied to a DC to DC converter (134), where a second d-c voltage (13) is produced. The output of the converter (134) is applied to an application specific integrated circuit (ASIC) (136) that produces a set of LED control signals that illuminate a set of LEDs.

20 Claims, 4 Drawing Sheets

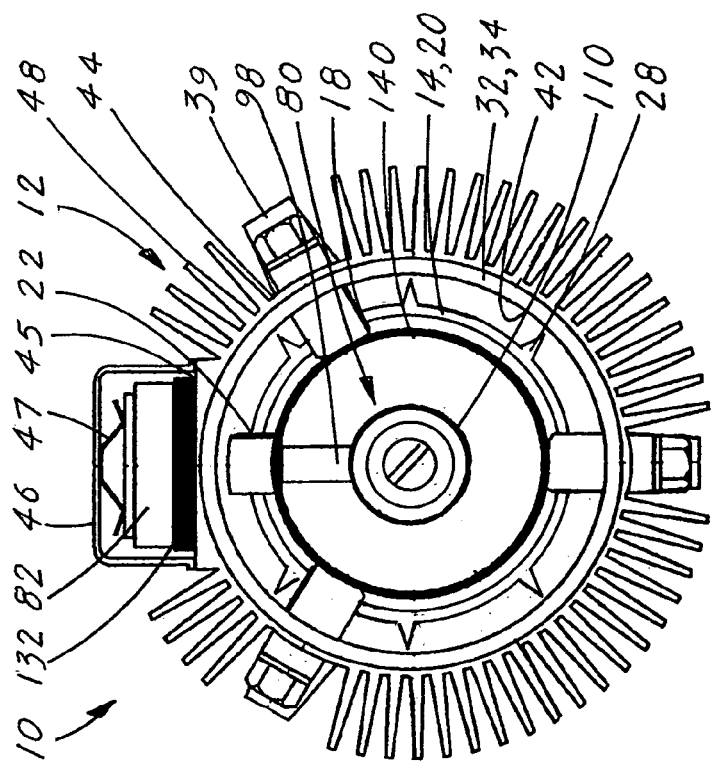
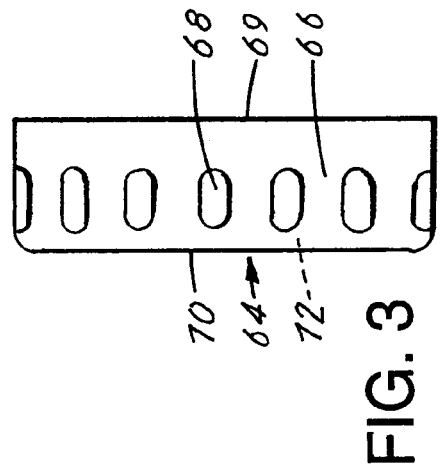
FIG. 3
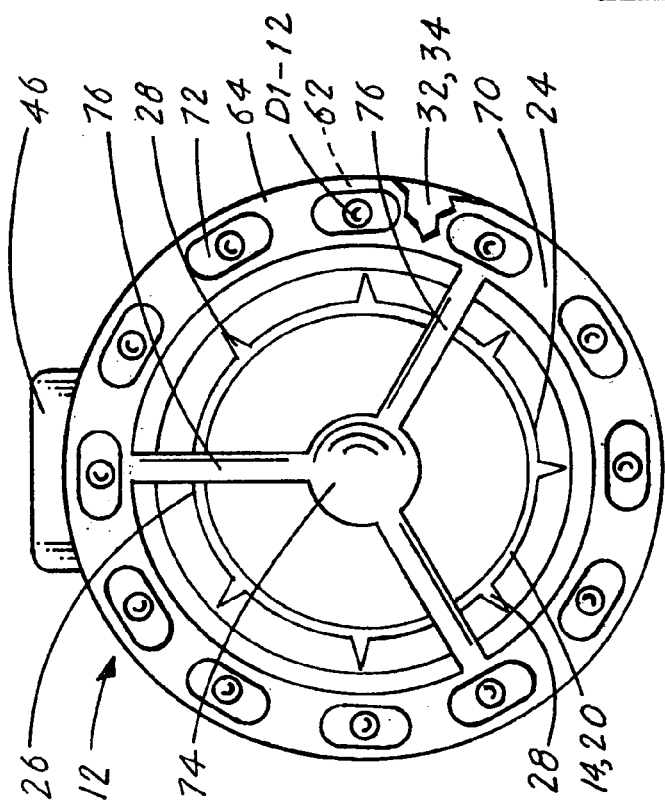
FIG. 2

SELF-POWERED, HEAT-ACTIVATED LED VEHICLE EXHAUST TIP ASSEMBLY

TECHNICAL FIELD

The invention pertains to the general field of vehicle exhaust tips, and more particularly to an exhaust tip having a set of LEDs that automatically illuminate when heated exhaust gases pass through the tip.

BACKGROUND ART

Vehicle exhaust tips have long been in use to enhance the appearance of a vehicle's exhaust pipe(s). Most exhaust tips are passive units that include tips designed with various slots and openings, various colors and various shapes. Other prior art exhaust tip designs include a vehicle internal power supply that when switched "on", illuminates various arrangements of Light Emitting Diodes (LEDs), various colors and designs of neon lights, or electro-luminescent panels.

The problems associated with prior-art exhaust tips utilizing a set of lights that are operated by a power supply is that the power supply requires an accessible switch and a wiring harness. The wiring harness is routed to terminate at the switch, which is typically located in the driver's compartment and must be placed in an "on" position to activate the lights. In contrast the instant invention requires no switch or harness, as the lights are turned on automatically by heated vehicle exhaust gases that pass through the exhaust tip.

A search of the prior art did not disclose any industry literature, catalogs or patents that read on the claims of the instant invention.

DISCLOSURE OF THE INVENTION

The self-powered, heat-activated LED vehicle exhaust tip assembly is designed to automatically illuminate a set of LED(s) when the vehicle exhaust gases pass through the exhaust tip. In its basic design, the assembly is comprised of the following five elements:

1. A cylindrical enclosure having an inner surface, an outer surface, a front edge and a rear edge. The front edge is dimensioned to accept and be attached to the vehicle exhaust pipe by an exhaust pipe attachment means. Attached to the exhaust tips' rear edge are a set of LEDs, which are viewable from the rear and sides of the exhaust tip.

2. A heat conducting sub-assembly that is located external to said enclosure.

3. A peltier device that interfaces with the heat conducting sub-assembly end that produces a first d-c output voltage.

4. A DC to DC converter that is applied and converts the first d-c voltage from the peltier device to a second d-c voltage.

5. An application specific integrated circuit (ASIC) that is applied the second d-c voltage from the DC to DC converter. The ASIC produces a set of LED control signals that are connected to and operate the set of LEDs.

The cylindrical enclosure can include on its outer surface a multiplicity of radial fins that extend longitudinally. The fins add to the aesthetics of the assembly and aid in cooling the cylindrical enclosure. To the rear edge of the cylindrical enclosure is attached a circular printed circuit board (PCB) to which is attached the set of LEDs, which preferably consists of twelve evenly-spaced LEDs. To protect the PCB and LEDs, an LED cover is attached to the rear edge of the enclosure. The LED cover includes a like set of front and side openings that allow the LEDs to be viewed from the front and from the sides.

The key to the invention is the heat conducting sub-assembly, which that includes a heated conductive horizontal structure, a heat conductive vertical rod and a heat conductive plate. The heat conductive horizontal member is centrally located within the cylindrical enclosure and is attached to the heat conductive plate via the heat conductive vertical rod. When vehicle exhaust gases pass through the cylindrical enclosure, the heat impinges on the heat conductive horizontal member and is passed onto the heat conductive plate. Attached to the plate is the peltier device that when heated by the plate produces the first d-c voltage.

The first d-c voltage is applied to the DC to DC converter where the voltage is increased to produce the second d-c voltage. The second d-c voltage is applied to the input of an application specific integrated circuit (ASIC). The ASIC then produces a set of LED control signals that control and operate the set of LEDs. The ASIC can be programmed to allow the LEDs to illuminate in various lighting patterns.

In view of the above disclosure, the primary object of the invention is to produce a vehicle exhaust tip having a set of LEDs that automatically illuminate when engine exhaust gases pass through the exhaust tip.

In addition to the primary object of the invention, it is also an object of the invention to produce a vehicle exhaust tip that:

can be designed to include a set of LEDs on various exhaust tip locations, utilize an electronics circuit that can be programmed to illuminate the LEDs in various lighting configurations, when two exhaust tips are utilized, each tip can be programmed by the electronics circuit to produce similar light patterns or different light patterns, and is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is an elevational rear view of the assembly.

FIG. 3 is a side elevational view of the LED cover.

FIG. 4 is an elevational rear view and partial cross-sectional view of the assembly with the printed circuit board and the LED cover removed for clarity.

BEST MODE FOR CARRYING OUT THE INVENTION

Figure 1:
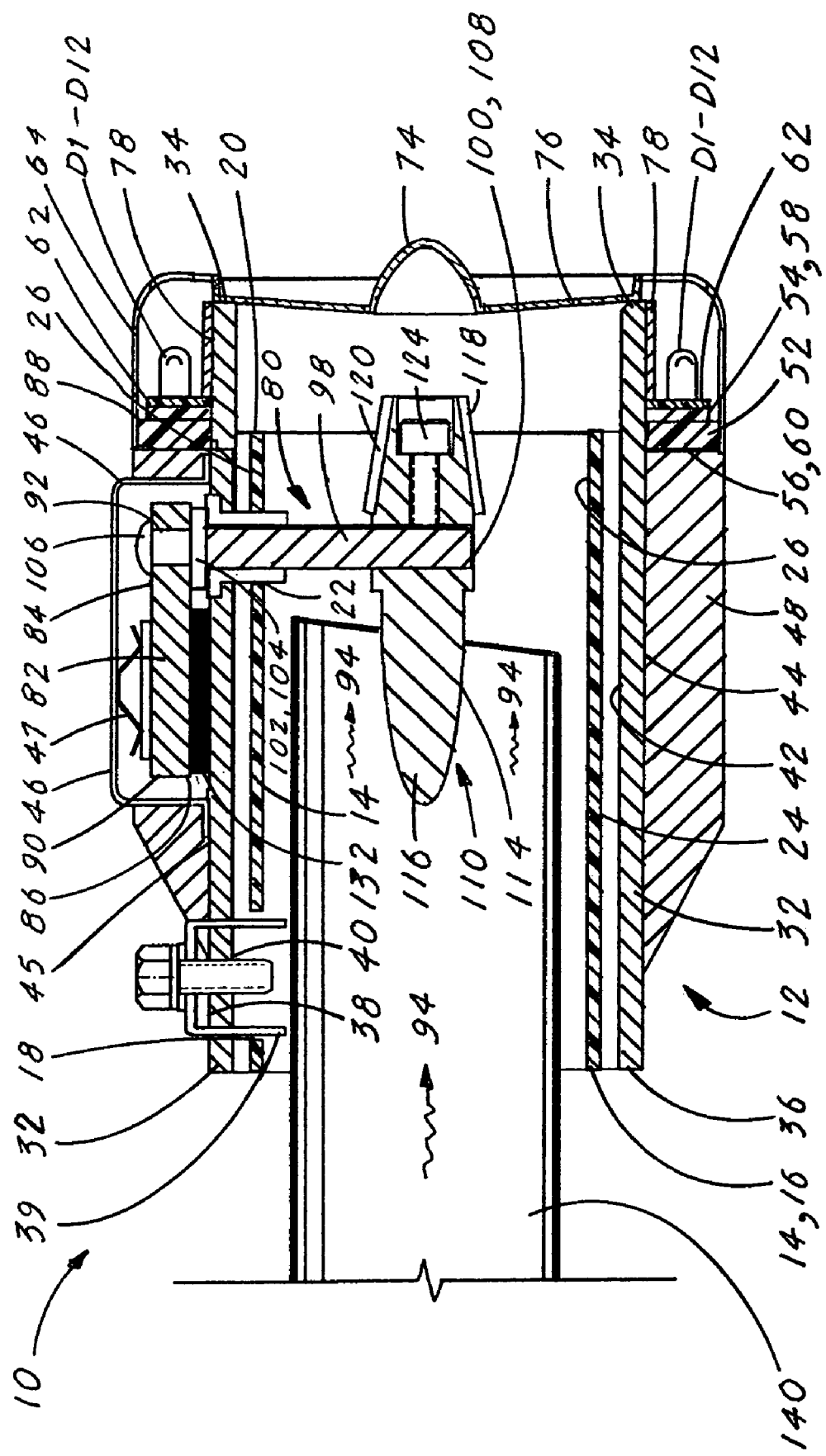
FIG. 1 is a cross-elevational side view and partial cross-sectional view of the self-powered, heat-activated LED vehicle exhaust tip assembly.

The best mode for carrying out the invention is presented in terms of a preferred embodiment for a self-powered, heat-activated LED vehicle exhaust tip assembly 10, (hereinafter "assembly 10"). Throughout this disclosure, the front and rear of the assembly 10 are referenced to the respective front and rear of a vehicle. Also, a reference to a vertical and horizontal plane is referenced to the vertical and horizontal plane shown in FIGS. 1 and 4.

The assembly 10, as shown in FIGS. 1–6, is comprised of three major elements: a cylindrical structure 12, a heat conducting sub-assembly 80, and an electronics circuit 130. The cylindrical enclosure 12 is further comprised of an inner housing 14, an outer housing 32, a printed circuit board (PCB) attachment structure 52, and a Light Emitting Diode (LED) cover 64.

The inner housing 14, as shown in FIGS. 1, 2 and 4, is formed of an insulating material and has a front edge 16 that has three evenly-spaced mounting slots 18, a rear edge 20 that includes a rod entry slot 22, a smooth lower surface 24, and an upper surface 26. The upper surface 26 preferably has integrally attached a plurality of radial fins 28 that extend longitudinally. Preferably, the plurality of radial fins are comprised of eight to twelve fins 28.

The outer housing 32, as also shown in FIGS. 1 and 4, is formed of a metal that preferably consists of an aluminum alloy. The housing 32 has a rear edge 34, a front edge 36 that is in alignment with the front edge 16 of the inner housing 14, as shown in FIG. 1, and a set of three exhaust pipe mounting flats 38 that are located adjacent to the front edge 36. Each flat 48 has a threaded bore 40, and all three flats are in alignment with the mounting slots 18 on the inner housing 14. The outer housing 32 also has a smooth inner surface 42, and an outer surface 44 having a peltier cover mounting flat 45 over which is attached a peltier enclosure 46. As shown best in FIG. 4, the outer housing 32 can be designed to include a multiplicity of radial fins 48 that extend longitudinally. The fins 48 add to the aesthetics of the assembly 10 and aid in cooling the cylindrical enclosure 12.

The PCB attachment structure 52 is formed of an insulating material and has an outer surface 54, an inner surface 56, an outer edge 58 and an inner edge 60. As shown in FIG. 1, the inner edge 60 is dimensioned to be attached, by a set of screws (not shown), adjacent to the rear edge 34 of the outer housing 32. Over the outer surface 44 and adjacent the rear edge 34 of the outer housing 32 can be inserted an LED reflection band 78 that reflects and increases the illumination of a set of LEDs D1–D12, which are mounted on a PCB 62 that is attached to the outer edge 58 of the structure 52.

The LED cover 64, as shown in FIGS. 1, 2 and 3, is dimensioned to fit over and to be attached, by a set of screws (not shown), to the outer surface 54 of the PCB attachment structure 52. The LED cover 64 has a side surface 66 having a plurality of LED side openings 68, as shown in FIG. 3, a front surface 69, and a rear surface 70 having a like plurality of LED rear openings 72, as shown in FIG. 2, that are in alignment with the LED side openings 68. To add to the aesthetics of the assembly 10, the LED cover 64 can include a centrally-located conic protrusion 74 that is integral with a set of three evenly-spaced support arms 76 that are integral with the rear surface 70 of the LED cover 64, as shown in FIGS. 1 and 2.

The cylindrical enclosure 12, in combination with the inner housing 14 and the outer housing 32, includes a means for attaching the cylindrical enclosure 12 to the vehicle exhaust pipe 140. This means is easily accomplished by preferably utilizing a set of three screw-adjustable exhaust pipe clamps 39. Each of the clamps 39 protrude sequentially through the three respective exhaust pipe mounting flats 38 located on the outer housing 32 and the three respective mounting slots 18 located on the inner housing 14 to make contract with the surface of the vehicle exhaust pipe 140, as shown in FIGS. 1 and 4.

The second major element of the assembly 10, as shown in FIG. 1, is the heat conducting sub-assembly 80, which is comprised of a horizontally-aligned heat conductive plate 82, a heat conductive vertical rod 98 and a heat conductive horizontal structure 110.

The heat conductive plate 82 is dimensioned to fit into the area encompassed by the peltier cover mounting flat 45. The plate 82 has an upper surface 84, a lower surface 86, a front edge 88, a rear edge 90, and a vertical rod bore 92 located adjacent the rear edge 90.

The heat conductive vertical rod 98 has a lower edge 100 and an upper edge 102. The upper edge 102 has a threaded rod bore 104 that is in alignment with the vertical rod bore 92 located on the heat conductive plate 82. When a bolt 106 is inserted through the vertical rod bore 92 on the plate 82, and the threaded rod bore 104 on the rod 98, the upper edge 102 of the rod 98 is attached to the plate 82, as shown in FIG. 1.

The heat conductive horizontal structure 110 has an upper surface 112, a lower surface 114, a front conic section 116 and a rear attachment section 118. The rear attachment section 118 has a threaded bore 120, and the conic section 116 has a rod bore 122. The rod bore 122 extends from the conic's section upper surface 112 to its lower surface 114, and is dimensioned to fricitonally accept the heat conductive vertical rod 98. When the lower edge 108 of the vertical rod 98 is flush with the lower surface of the horizontal structure 110, a threaded bolt 124 is threaded into the threaded bore 120, which then secures the vertical rod 90 to the horizontal structure 110. As shown in FIG. 1, the front conic section 116 is located at substantially the center of the vehicle exhaust pipe 140, which aids in producing an optimum laminar flow through the cylindrical enclosure 12.

The third and final major element of the assembly 10 is the electronics circuit 130 which is presented in two design configurations.

Figure 5:
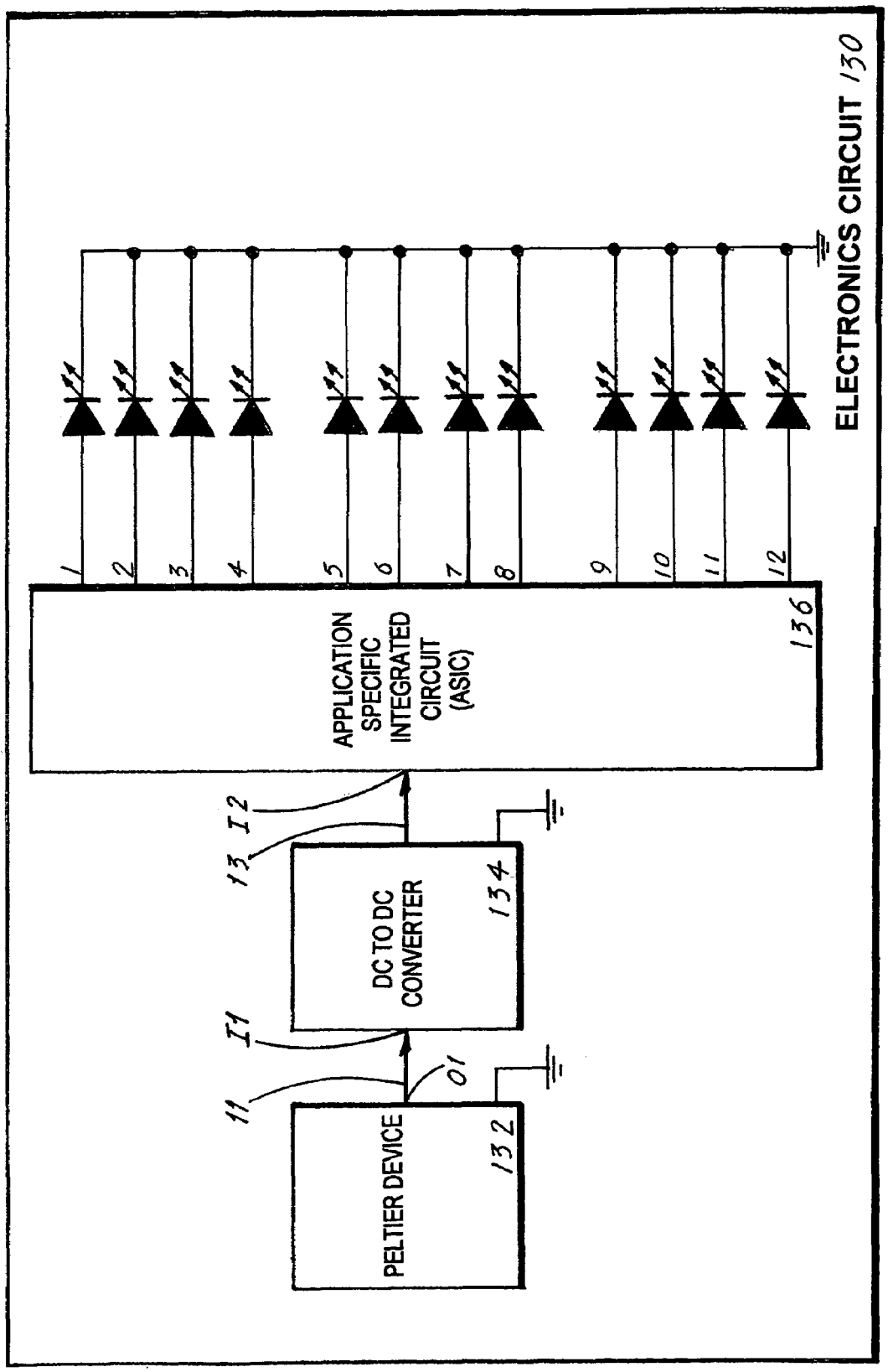
FIG. 5 is a block diagram of a first design configuration of the electronics circuit.

The first design, as shown in FIG. 5, is comprised of a peltier device 132, a DC to DC converter 134, an Application Specific Integrated Circuit (ASIC) 136, and a set of light emitting diodes (LEDs) that preferably consists the twelve LEDs (D11–D12).

The peltier device 132, as shown in FIG. 1, is located between the peltier cover mounting flat 45 located on the outer housing 32 and the lower surface 86 of the heat conductive plate 82. Between the upper surface 84 of the heat conductive plate 82 and the peltier enclosure 46 is located a compression device 47 such as a compression spring 47, as also shown in FIG. 1. The spring 47 maintains the peltier device 132 pressed tightly against the heat conductive plate 82 to allow maximum heat transfer when heat from the heat conducting sub-assembly is applied to the peltier device 132. The heated peltier device 132 produces a first output 01 consisting of a first d-c output voltage 11 that is between 0.8 to 1.8 volts d-c.

The first d-c output voltage 11 is applied to the input 11 of the DC to DC converter 134, which processes the input and produces a second d-c output voltage 13 consisting of 3.0±0.5 volts d-c. The second d-c output voltage 13 from the DC to DC converter 134 is applied to the input 12 of the ASIC 136. The output of the ASIC 136 is a set of LED control signals that control the operation of the LEDs.

In the first design configuration of the electronics circuit 130, as shown in FIG. 5, the output of the ASIC 136 consists of twelve output lines 1–12, wherein each of output lines 1–12 is independently and respectively connected to a set of LEDs D1–D12.

Figure 6:
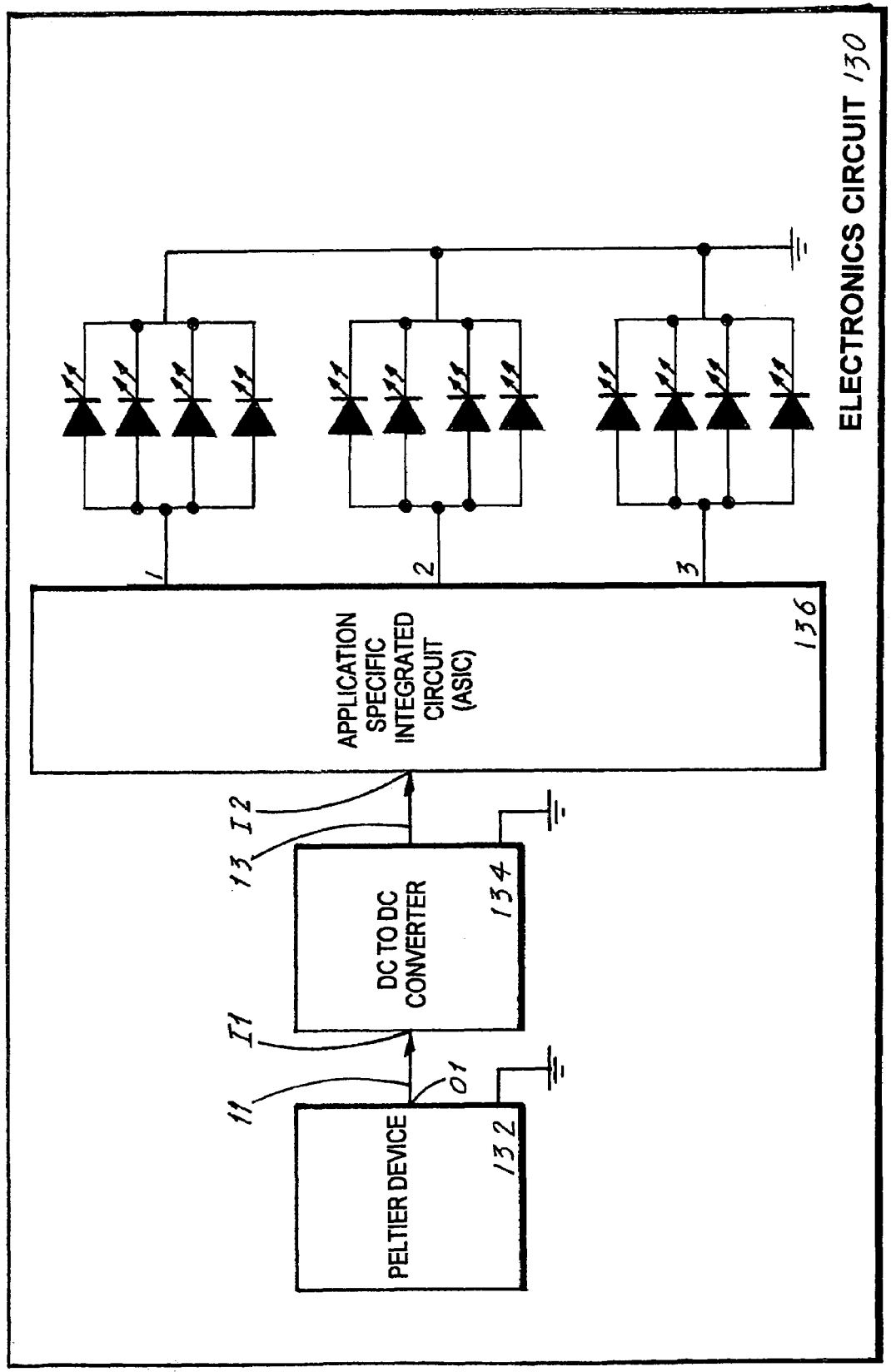
FIG. 6 is a block diagram of a second design configuration of the electronics circuit.

In the second design configuration of the electronics circuit 130, as shown in FIG. 6, the output of the ASIC 136 consist of three output lines 1, 2 and 3. The first output line 1 is connected to a first set of the four LEDs, D1–D4, the second output line 2 is connected to a second set of four LEDs D5–D8, and the third output line 3 is connected to a set of four diodes D9–D12.

The ASIC 136 in both the first and second design configurations can be programmed to produce an LED lighting configuration that causes the set of LEDs to:
  all illuminate at once,
  blink in a selectable sequence or to blink in random order, or
  to change direction in either a clockwise direction, a counter-clockwise direction or in random order.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and cope of the claims.

The invention claimed is:

1. A self-powered, heat-activated LED vehicle exhaust tip assembly comprising:
  a) a cylindrical enclosure having an inner surface, an outer surface, a front edge and a rear edge, wherein the front edge is dimensioned to accept and to be attached to a vehicle exhaust pipe by an exhaust pipe attachment means, and the rear edge has attached a set of LEDs that are viewable from the rear and sides of said exhaust tip,
  b) a heat conducting sub-assembly having a heat conductive horizontal structure that is positioned at the substantial center of said cylindrical enclosure, and that via a heat conductive vertical rod is attached to a heat conductive plate located external to said enclosure,
  c) a peltier device that interfaces with the heat conductive plate, wherein when said plate is heated by the passing exhaust gases the heat is transferred from the plate to said peltier device, which then produces a first d-c output voltage,
  d) a DC to DC converter that is applied and converts the first d-c voltage from said peltier device to a higher level second d-c voltage, and
  e) an application specific integrated circuit (ASIC) that is applied the d-c voltage from said DC to DC converter and produces a set of LED control signals that are connected to and control the operation of said set of LEDs.

2. The assembly as specified in claim 1 wherein the outer surface of said cylindrical enclosure further comprises a multiplicity of radial fins that extend longitudinally.

3. The assembly as specified in claim 1 wherein said set of LEDs are comprised of twelve evenly-spaced LEDs that are attached to a printed circuit board that is attached to the rear edge of said cylindrical enclosure.

4. The assembly as specified in claim 3 further comprising an LED cover that attaches to the rear edge of said cylindrical enclosure, wherein said LED cover has a plurality of side openings and a plurality of rear openings that allow said LEDs to be viewed from the side and from the rear.

5. The assembly as specified in claim 4 further comprising an LED reflection band that is inserted into said LED cover, wherein said band reflects and increases the illumination of said LEDs.

6. The assembly as specified in claim 1 wherein said ASIC can be programmed to produce an LED lighting configuration that causes said LEDs to:
  a) illuminate all at once,
  b) "blink" either in sequence or in random order, and change in either direction or in random order.

7. The assembly as specified in claim 1 wherein said heat conductive horizontal structure has a front conic section that aids in producing a laminar flow of exhaust gases through said cylindrical enclosure.

8. A self-powered, heat-activated LED vehicle exhaust tip assembly comprising:
  a) a cylindrical enclosure comprising:
    (1) an inner housing having a front edge that further has three evenly-spaced mounting slots, a rear edge having a rod entry slot, a smooth lower surface, and an upper surface having a plurality of radial fins that extend longitudinally,
    (2) an outer housing having a rear edge, a front edge in alignment with the front edge of said inner housing, a set of three exhaust pipe mounting flats located adjacent the front edge with each flat having a threaded bore and all three flats in alignment with the mounting slots on said inner housing, a smooth inner surface, and a smooth outer surface having a peltier cover mounting flat,
    (3) a peltier enclosure having means for being attached to the peltier cover mounting flat,
    (4) means for attaching said cylindrical enclosure to the vehicle exhaust pipe,
    (5) a printed circuit board attachment structure having an outer surface, an inner surface, an outer edge and an inner edge, wherein the inner edge is attached to rear edge of said outer housing,
    (6) an LED cover dimensioned to fit over and to be attached to the outer surface of said printed circuit board attachment structure, said cover comprising a side surface having a plurality of LED side openings, a rear surface having a like plurality of LED rear openings that are in alignment with the LED side openings, and a centrally located conic protrusion integral with a set of three support arms that are integral with the rear surface of said cover,
    (7) a heat conducting sub-assembly comprising:
      (a) a horizontally-aligned heat conductive plate dimensioned to fit into the peltier cover mounting flat, said plate having an upper surface, a lower surface, a front edge, a rear edge and a vertical rod bore located adjacent the rear edge,
      (b) a heat conductive vertical rod having a lower edge, and an upper edge further having a threaded rod bore that is in alignment with the vertical rod bore on said heat conductive plate, wherein when a bolt is inserted through the vertical rod bore on said plate and the threaded rod bore on said rod, the upper edge of the rod is attached to said plate,
      (c) a heat conductive horizontal structure having an upper surface, a lower surface, a front conic section, and a rear attachment section having a threaded bore, wherein the conic section also has a rod bore that extends from the upper surface to the lower surface, and that is dimensioned to frictionally accept said heat conductive vertical rod, and wherein when the lower edge of said vertical rod is flush with the lower surface of said horizontal structure, a threaded bolt is threaded into the threaded bore which then secures said vertical rod to said horizontal structure,
b) an electronics circuit comprising:
   (1) a peltier device, wherein when heated by the vehicle exhaust gases, via said heat conducting sub-assembly, produces a first output consisting of a first d-c output voltage,
   (2) a DC to DC converter having an input that is applied the first d-c output voltage from said peltier device, and having an output that produces a second d-c output voltage, and
   (3) an application specific integrated circuit (ASIC) having an input that is applied the second d-c output voltage from said DC to DC converter (IC), and having an output that produces a set of LED control signals that are applied to the anode of a corresponding set of LEDs, wherein said ASIC can be programmed to produce several LED lighting configurations.

9. The assembly as specified in claim 8 wherein said outer surface of said outer housing further comprises a multiplicity of radial fins that extend longitudinally.

10. The assembly as specified in claim 9 wherein said inner housing is formed of an insulating material and said plurality of radial fins located on said inner housing are comprised of twelve fins.

11. The assembly as specified in claim 8 wherein the means for attaching said cylindrical enclosure to the vehicle exhaust pipe comprises a set of three screw-adjustable exhaust pipe clamps that protrude through the three exhaust pipe mounting flats on said outer housing, and the three mounting slots on said inner housing.

12. The assembly as specified in claim 8 further comprising an LED reflection band inserted over the outer surface of said printed circuit board attachment structure, wherein said band reflects and increases the illumination of said LEDs.

13. The assembly as specified in claim 8 wherein the front conic section of said heat conductive horizontal structure is located at substantially the center of the vehicle exhaust pipe which aids in producing an optimum laminar flow through said cylindrical enclosure.

14. The assembly as specified in claim 8 wherein the output voltage of said peltier device is between 0.8 to 1.8 volts d-c.

15. The assembly as specified in claim 14 wherein said peltier device is located between the peltier cover mounting flat located on said outer housing and the lower surface of said heat conductive plate, wherein between the upper surface of the heat conductive plate and the peltier enclosure is located a compression device that maintains the peltier device pressed tightly against the heat conductive plate.

16. The assembly as specified in claim 8 wherein the output voltage of said DC to DC converter is 3.0±0.5 volts d-c.

17. The assembly as specified in claim 8 wherein said set of LEDs is comprised of:
   a) a set of twelve LEDs, wherein each LED is connected to an independent line on said ASIC, or
   b) three sets of LEDs, wherein each set consists of four LEDs, wherein each set of four LEDs is connected to a single output line on said ASIC, and wherein said LEDs are mounted on a printed circuit board that is attached to the outer surface of said printed circuit board attachment structure.

18. The assembly as specified in claim 8 wherein said ASIC is programmed to produce an LED lighting configuration that causes said set of LEDs to all illuminate at once.

19. The assembly as specified in claim 8 wherein said ASIC is programmed to produce an LED lighting configuration that causes said set of LEDs to blink in a selectable sequence or in random order.

20. The assembly as specified in claim 8 wherein said ASIC is programmed to produce an LED lighting configuration that causes said set of LEDs to change direction in either a clockwise direction, a counter-clockwise direction or in random order.

* * * * *